United States Patent [19]

Wallace

[11] 4,408,906
[45] Oct. 11, 1983

[54] HIGH SPEED ON-DEMAND PROCESSOR FOR PRESSURE SENSITIVE LABELS

[75] Inventor: Leonard J. Wallace, Charlotte, N.C.

[73] Assignee: International Business Machines, Armonk, N.Y.

[21] Appl. No.: 329,833

[22] Filed: Dec. 11, 1981

[51] Int. Cl.³ .............................................. B41J 3/516
[52] U.S. Cl. ..................................... 400/104; 400/611;
101/69; 101/228; 101/288; 156/384; 360/101;
226/104; 226/118
[58] Field of Search ....................... 400/104, 105, 611;
101/66, 68, 69, 227, 228, 288, 292; 156/384,
584; 226/104, 118, 119; 360/101

[56] References Cited

U.S. PATENT DOCUMENTS

| | | | |
|---|---|---|---|
| 3,395,385 | 7/1968 | Scoville | 360/101 |
| 3,651,503 | 3/1972 | Kono | 101/66 |
| 3,924,267 | 12/1975 | Holt | 360/101 |
| 4,040,108 | 8/1977 | Nakata | 360/101 |
| 4,080,239 | 3/1978 | Real et al. | 156/384 |
| 4,111,121 | 9/1978 | Borum | 101/227 |
| 4,129,238 | 12/1978 | Herd | 101/228 |
| 4,278,112 | 6/1981 | French et al. | 101/288 |

FOREIGN PATENT DOCUMENTS 52-42400  4/1977  Japan .................................. 101/288

OTHER PUBLICATIONS

Mueller, "Magnetic Stripe Reader/Writer With Improved Head Suspension", IBM Technical Disclosure Bulletin, vol. 19, No. 5, Oct. 1976, pp. 1808-1809.
Kambic et al, "Magnetic Encoder for Printer Terminal", IBM Technical Disclosure Bulletin, vol. 19, No. 9, Feb. 1977, pp. 3512-3513.
Hall et al, "Self Contained Magnetic Stripe Reader/Encoder", IBM Technical Disclosure Bulletin, vol. 20, No. 5, pp. 1879-1880 10/77.

*Primary Examiner*—William Pieprz
*Attorney, Agent, or Firm*—M. S. Bigel; E. R. Coffman; Gregory A. Conley

[57] ABSTRACT

An apparatus for encoding magnetic data and printing on a plurality of closely spaced labels releasably mounted on a supply roll of carrier strip, includes a magnetic head for encoding the labels and a printer for printing on the labels. The carrier strip extends from the supply roll past the magnetic head and to the printer, and forms a variably sized loop between the head and the printer. The variably sized loop has a gap, across which an encoded label may be transferred so that movement of a label past the printer is independent of movement of the supply roll. The magnetic head is movable parallel to the carrier strip so that the plurality of labels may be encoded and printed without reversing the supply roll, thus increasing the speed at which labels may be encoded and printed. The speed of the movable head may be precisely controlled to ensure accurate encoded. The encoded data is verified when the magnetic head moves over the label back to its original position.

18 Claims, 6 Drawing Figures

HIGH SPEED ON-DEMAND PROCESSOR FOR PRESSURE SENSITIVE LABELS

DESCRIPTION

Technical Field

This invention relates to an apparatus for processing pressure sensitive labels and more particularly to a high speed on-demand processor for pressure sensitive labels.

Pressure sensitive labels are increasingly being used for affixing human or machine readable information onto an object. The information may be printed (for example a universal product code symbol or alphanumeric data), or, if the label has a magnetic stripe thereon, the information may be magnetically encoded. A label processor is employed for placing such information on labels, and may also physically affix the processed labels to an object.

In one form of label processor, a plurality of labels releasably mounted on a carrier strip are sequentially processed in a continuous manner. Alternatively, in an "on-demand" processor, one of the plurality of labels releasably mounted on a carrier strip is processed, when and only when the label is required for affixation onto an object. In an on-demand label processor it is important that a single label be fully processed and applied to an object without processing the adjacent labels on the carrier strip. Moreover, processing of a single label must occur at high speed so that the label processor is rapidly made available for processing adjacent labels.

In present day applications, it is often necessary to process a label at more than one processing station in an on-demand processor. For example, more than one printing station may be required for printing machine readable and human readable information on a label. Alternatively, a first processing station may be employed for encoding magnetic information, while a second processing station may be employed for printing on the label. In such a multiple processing machine, it is important that multiple processing of a label takes place without processing adjacent labels on the carrier strip. Moreover, multiple processing of a single label must occur at high speed so that the label processor is rapidly made available for processing adjacent labels.

On demand processors encounter special problems when magnetic information is to be encoded on the labels. As is well known in the art, magnetic encoding of digital information is very dense, with many bits of information encoded per inch. The location of each bit, and the spacing between adjacent bits must be precisely controlled. Such density and precision must not be attained at the expense of overall processing speed.

Furthermore, it is desirable to verify proper encoding before the label is dispensed, as proper encoding may not be visually verified after dispensing. If the encoding on a given label is improper, the label should not be used or dispensed onto an object. The improperly encoded label should be retained in the processor, and a new label encoded and used in place of the improperly encoded label. Verification must be accomplished without adding excessive cost or complexity to the processor and without degrading overall processing speed.

BACKGROUND ART

A multi-impression printer for pressure sensitive labels is disclosed in U.S. Pat. No. 4,111,121 to Borum. In the Borum printer, a supply roll of labels is unwound to advance a label through a first printer. The supply roll is further unwound to pass the printed label over a peeler roller and detach it from the carrier strip. As it is being detached, the leading edge of the printed label moves across an air gap and is reattached to a forward portion of the carrier strip. Between the detaching and reattaching stations a variable sized loop of carrier strip is formed, so that once reattached, further movement of the printed label occurs by movement of the carrier strip loop, without movement of the supply roll. The reattached label passes through a second printer and is dispensed.

The Borum multi-impression printer is not capable of high-speed on-demand label processing. This is because a label is moved through the first printer and to the detaching roller by unwinding the supply roll. Thus, by the time the printed label has been detached, the adjacent label has at least partially passed through the first printer as well. Clearly, processing cannot be on-demand if the adjacent label has already passed through the first printer during the printing and detaching of a first label.

Borum rewinds the supply roll after a label has been detached, to thereby return the adjacent label to a position upstream of the first printer. Thus, printing of the adjacent label need not occur until required, and the multi-impression printing may be performed in an on-demand fashion.

Unfortunately, reversing the supply roll after a label has been detached greatly slows down the label processor. A heavy supply roll of labels, having high inertia, requires a long time to reverse, accelerate and stop. This time lag degrades overall processor speed.

Reversal of the supply roll also introduces reliability problems into the label processor. As is well known to label users, the carrier strip often has cuts or nicks as a result of the label manufacturing operation. If such a cut or nicked roll is rapidly reversed, the carrier strip will tear, necessitating shut down and rethreading of the processor. Clearly, reversal of the supply roll is an unacceptable solution if high speed, reliable operation is required.

The prior art has also failed to solve the unique problems encountered in encoding magnetic information on labels. For example, precise inter-bit spacing cannot be attained when encoding takes place by unwinding the heavy supply roll to move a label past a magnetic encoding station. Moreover, the prior art has not provided efficient means for verifying the encoded information. Once the label has moved past the encoding station, reversal of the supply roll is necessary to bring the encoded label back through the encoding station for verification. Such reversal would degrade overall processing time as well as increase the possibility of tearing the carrier strip, as described above.

DISCLOSURE OF THE INVENTION

It is an object of the present invention to provide a high-speed on-demand processor for pressure sensitive labels.

It is a further object of the invention to provide a processor for pressure sensitive labels wherein a label is processed at two processing stations without affecting processing of the remainder of the labels on the carrier strip.

It is a further object of the invention to provide a processor for pressure sensitive labels wherein the supply roll need not be rewound after processing a first label, prior to processing the next adjacent label.

It is still a further object of the invention to provide a processor for pressure sensitive labels including a magnetic encoding station, wherein precise inter-bit spacing of encoded information may be obtained.

It is still a further object of the invention to provide a processor for pressure sensitive labels including a magnetic encoding station, wherein the encoded data may be verified without requiring the supply roll to be rewound for data verification.

These and other objects are provided by an on-demand processor for processing labels at first and second processing stations wherein the first processing station is made movable relative to the carrier strip. By employing a movable first processing station, the supply roll need not be reversed to properly position the next label. Rather, the first processing station can process a label which has already passed therethrough by moving forward over the label and then returning back to its original position. Forward and reverse movement of the first processing station may be accomplished rapidly and without the danger of tearing the carrier strip. Furthermore, when the first processing station is a magnetic read/write head, encoding of magnetic data is accomplished by moving the head over the label, rather than moving the label past the head by unwinding the supply roll. Movement of the compact magnetic head may be precisely controlled to ensure precise inter-bit spacing. On the return movement of the magnetic head the encoded data may be verified.

In a preferred embodiment of the invention the first processing station is a magnetic read/write head for encoding magnetic data on a label. The magnetic read/write head is mounted for movement parallel to the direction of movement of the labels. The second processing station is a fixedly mounted printer. To process a first label, the label supply is unwound to convey the first label beyond the magnetic head. The magnetic head is then moved over the first label to encode magnetic information thereon, and returned back to its original position. Movement of the magnetic head is precisely controlled to ensure accurate recording. During return of the magnetic head, the data encoded on the label is verified. The label supply is then unwound to transfer the encoded label across a gap formed in a variable sized loop of carrier strip. Transfer of the first label also brings the next label into proper position beyond the magnetic head. The transferred label is reattached to a forward portion of the carrier strip and moved past the printer via movement of the variable sized carrier loop. The label is then applied to an object by an applicator pin and roller. When processing of the next label is required, the magnetic head moves as it did for the first label. Reversal of the supply roll is not required.

BEST MODE FOR CARRYING OUT THE INVENTION

Figure 1:
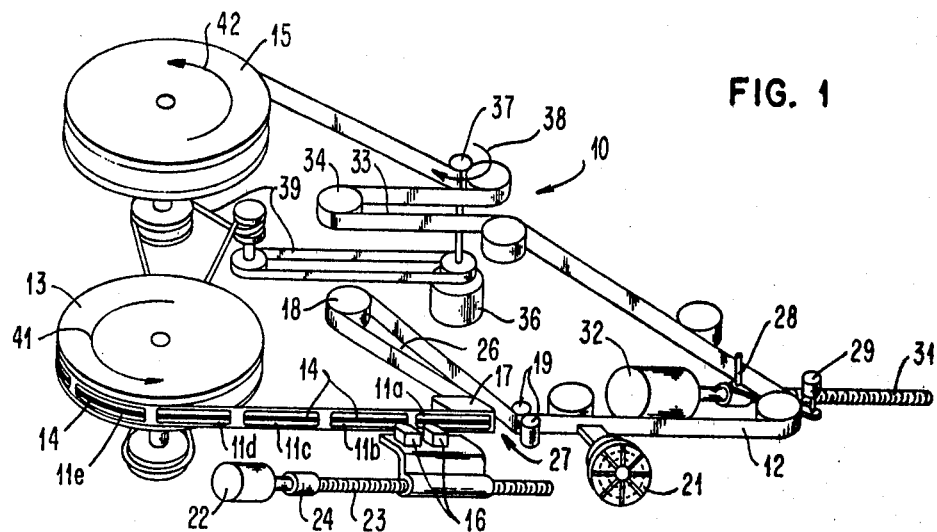
FIGS. 1-6 are similar perspective views illustrating the step by step processing of a label by a high-speed on-demand label processor employing the present invention.

Referring now to FIG. 1, a high-speed on-demand processor for pressure sensitive labels employing the present invention is illustrated. Label processor 10 encodes magnetic information and prints alphanumeric data on pressure sensitive labels 11 which are releasably mounted on carrier strip 12. Label processor 10 operates in an on-demand fashion, i.e., a single label (for example, label 11a) may be encoded and printed without encoding or printing adjacent label 11b or subsequent labels 11c-11f.

As shown in FIG. 1, labels 11 are closely spaced on carrier strip 12, and include a magnetic strip 14 on which magnetic data may be encoded. The carrier strip is wound on a supply roll 13, threaded through the machine and onto takeup roll 15.

Label processor 10 includes two processing stations. The first processing station comprises a pair of movable magnetic read/write heads 16 for encoding magnetic data on the magnetic stripe. The magnetic read/write heads are rendered movable parallel to the direction of movement of the labels by motor 22 and screw drive 23. Gears 24 provide a reduction in motor drive speed, if necessary. Of course, other drive means for movable magnetic read/write heads 16 are well known to those having skill in the art. For example, IBM Technical Disclosure Bulletin, Vol. 19, No. 5, pp. 1808-1809 discloses the use of a linear motor for moving a magnetic head in a reciprocating manner.

The second processing station comprises fixedly mounted impact printer 21. It will be recognized by those having skill in the art that first processing station 16 and second processing station 21 may be printers, magnetic read/write heads, punches, or other electromechanical or optical means for placing information on labels; the only requirement being that first processing station 16 is movable parallel to the direction of motion of the carrier strip so as to render reversal of supply roll 13 unnecessary.

Interposed between magnetic heads 16 and printer 21 is variable sized loop 26 of carrier strip formed around movable dancer roller 18 at one end and having gap 27 at the other end. Labels are detached from carrier strip 12 by passing the carrier strip over a detaching station, here peeler plate 17. A label moves across gap 27 and is reattached to a forward portion of the carrier strip by attaching rollers 19. Once a label is reattached all subsequent label movement occurs by shortening loop 26 via movement of dancer roller 18, as will be described below. The label processor of the present invention also includes a movable application pin 28 and application roller 29 for applying a processed label to an object. Application pin 28 and roller 29 are rendered movable by screw drive 31 and motor 32. Label processor 10 also includes a second variable sized loop 33 of carrier strip 12 wrapped around second movable dancer roller 34.

Operation of a high-speed on-demand label processor employing the present invention will now be described. Referring again to FIG. 1, drive motor 36 is energized to drive capstan 37 clockwise as shown by arrow 38. By virtue of belt drive 39, supply roll 13 is driven counterclockwise as indicated by arrow 41, while take up roll 15 is driven counterclockwise as indicated by arrow 42. Supply roll 13 is unwound until label 11a is conveyed beyond magnetic read/write head 16 and is adjacent loop 26 as illustrated in FIG. 1.

Figure 2:
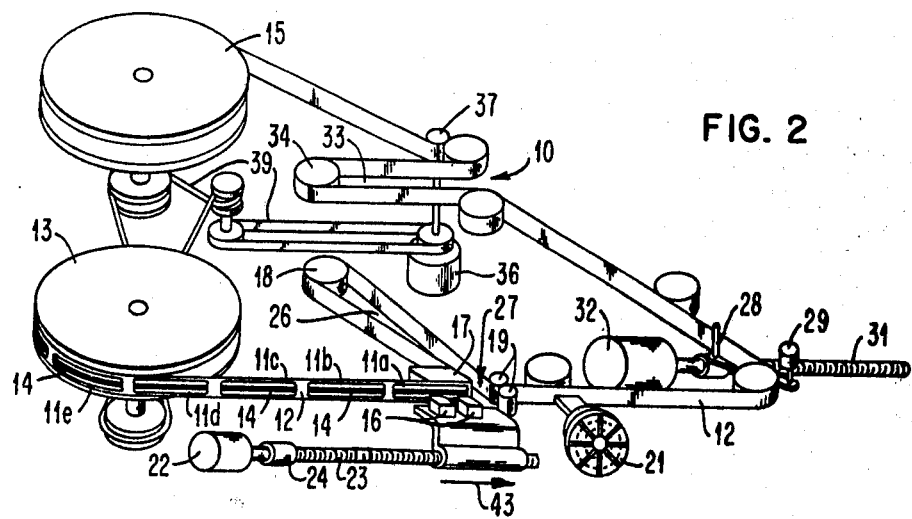

Referring now to FIG. 2, the magnetic stripe 14 on label 11a is encoded by moving magnetic heads 16 towards loop 26 in the direction shown by arrow 43. The heads are then returned to their original position illustrated in FIG. 1, by reversing motor 22. During return travel, verifiaction of the encoded data takes place. Screw drive 23 provides precisely controlled head movement in order to ensure proper encoding and verifying. Such precise movement between the labels and the head could not be attained by moving the carrier strip back and forth past stationary read/write head.

Figure 3:
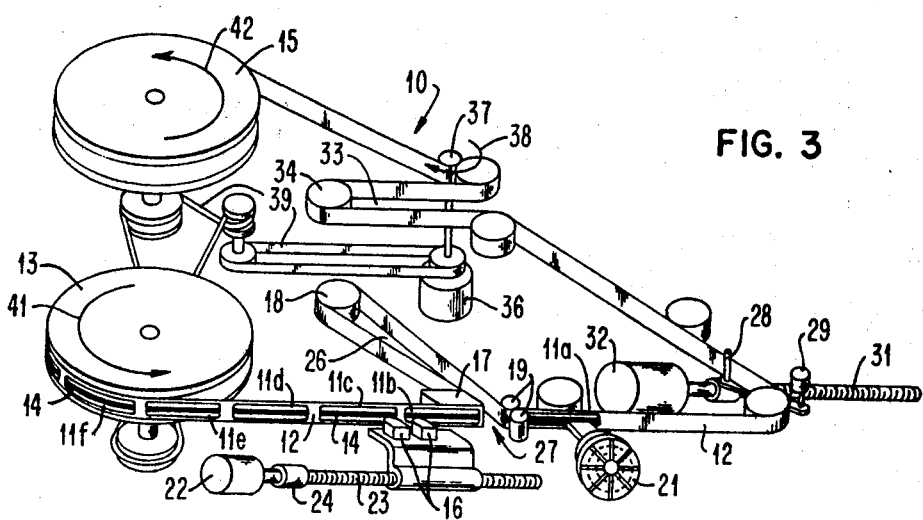

Referring now to FIG. 3, encoded label 11a is detached from carrier strip 12 by passing the carrier strip and label 11a over peeler plate 17. As the leading edge of label 11a detaches it traverses gap 27 in loop 26 and is reattached to a forward portion of the carrier strip via attaching rollers 19. FIG. 3 illustrates the appearance of processor 10 after encoded label 11a has been transferred across the gap and reattached to the forward portion of the carrier strip. Once reattached, all subsequent movement of label 11a occurs without movement of the supply roll, by movement of dancer roller 18, as described below.

Figure 4:
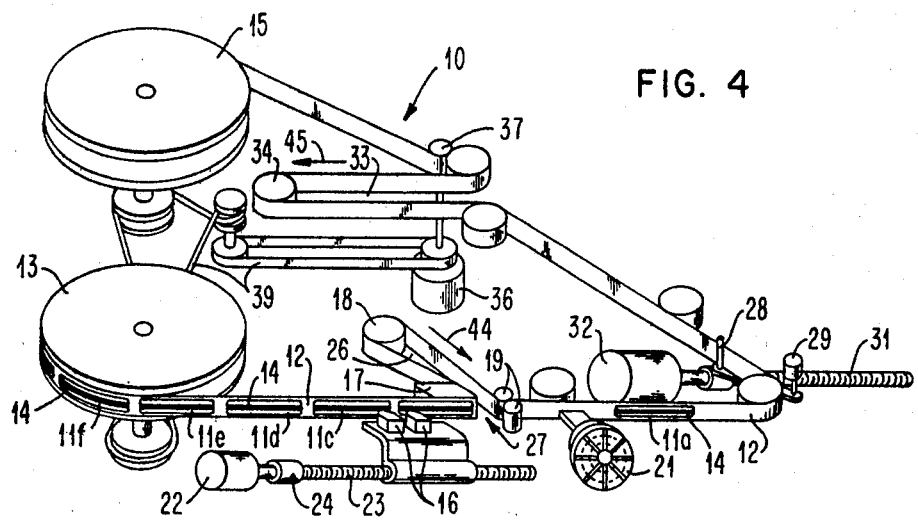

Referring now to FIG. 4, label 11a is conveyed past printer 21 via movement of first dancer roller 18 in the direction of arrow 44 and of second dancer roller 34 in the direction of arrow 45. Printing occurs as the label moves past the print head of fixedly mounted impact printer 21. After printing, movement of dancer rollers 18 and 34 in the direction of arrows 44 and 45, respectively, continues to convey label 11a adjacent application pin 28.

Figure 5:
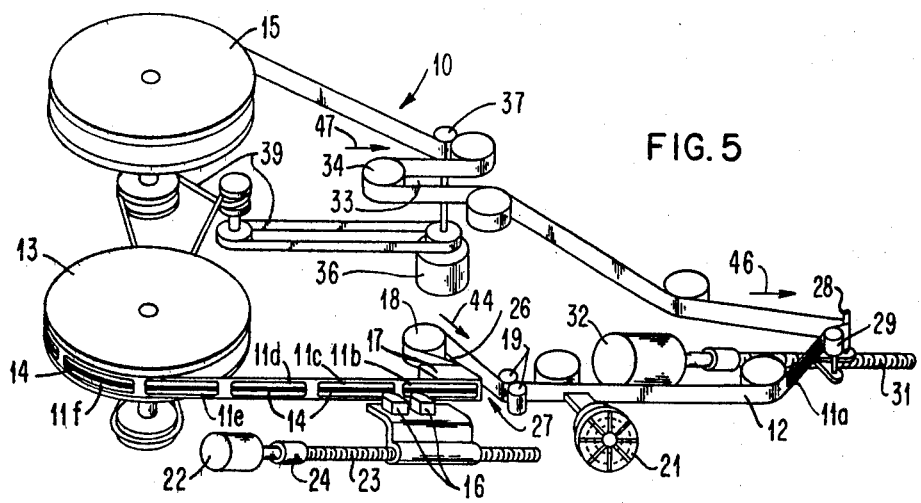
Figure 6:
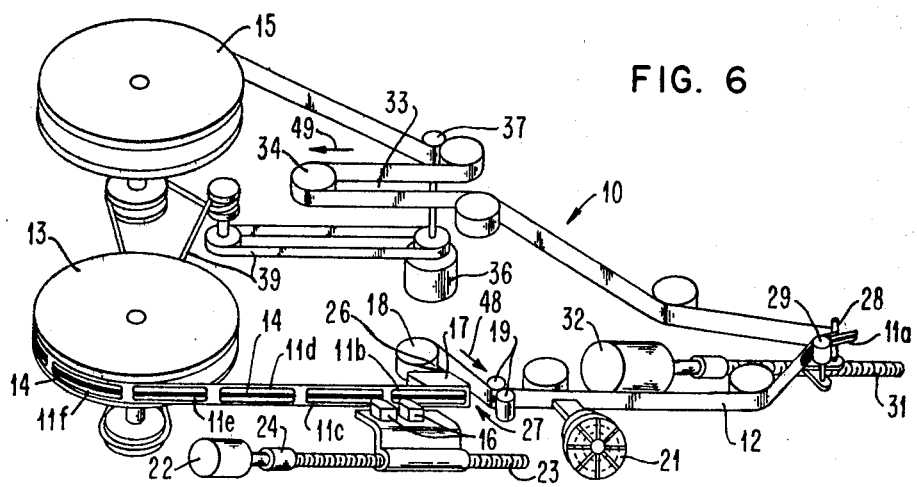

Referring now to FIG. 5, application pin 28 and application roller 29 move in the direction of arrow 46 so that the label may be applied to a desired location on an object (not shown). Label 11a is maintained adjacent application pin 28 during the application pin's movement via concurrent movement of dancer rollers 18 and 34 in the directions of arrows 44 and 47, respectively. When application pin 28 reaches the desired label application location, the application pin stops and the label is peeled from the carrier strip by movement of dancer rollers 18 and 34 in the direction shown in FIG. 6 by arrows 48 and 49, respectively. As the label is peeled from its carrier strip, application roller 29 pivots from its position shown in FIG. 6 to press the leading edge of the label onto the object to ensure accurate placement.

After label 11a is applied, dancer rollers 18 and 34, and application pin 28 are returned to their original positions shown in FIG. 1. Label processor 10 is then ready for on-demand processing of next label 11b.

The following observations will be made with regard to the processing of next label 11b. During the processing of first label 11a (illustrated in FIGS. 1-6), label 11b is moved so that at least its leading edge is located between heads 16 and loop 26. Were magnetic heads 16 not movable, encoding of label 11b could only occur by rewinding supply roll 13 to return label 11b upsream of heads 16. Encoding could then proceed by unwinding supply roll 13 to convey label 11b past magnetic heads 16 in the forward direction. This rewinding and unwinding process would consume a great deal of time due to the inertia of supply roll 13. Moreover, it is possible to tear carrier strip 12 during rewind.

The entire rewind/unwind process described above is obviated by employing a movable magnetic head in accordance with the present invention. With label 11b between heads 16 and loop 26, encoding takes place by moving heads 16 in the forward direction as shown in FIG. 2, while verifying takes place as the heads return to their original position shown in FIG. 3. The heads may be moved rapidly and precisely to ensure proper encoding verifying, as they are lightweight compared to the supply roll. There is also no danger of tearing the carrier strip. Thus, overall speed and reliability of the label processor is greatly enhanced.

It will also be observed by one having skill in the art that the step of unwinding the supply roll to convey a label beyond magnetic heads 16, as illustrated in FIG. 1, is only necessary with respect to the first label on the supply roll. Thereafter, processing of one label will automatically bring the next label into position between magnetic heads 16 and loop 27, as illustrated in FIGS. 3-6. Moreover, it will also be observed that the magnetic heads may be located less than one label length from loop 27 so that only a portion of a label is conveyed beyond the heads during processing of the previous label. In such a case, encoding of a label may be accomplished by moving the heads forward from their rest position to the leading edge of the label in the direction of arrow 43 (FIG. 2), backward to the trailing edge of the label and then forward to their rest position.

Other features may be incorporated into the label processor of FIGS. 1-6 in order to enhance the operation thereof. For example, encoding and printing may be performed in an overlapping manner. Thus, after a first label is encoded and transferred across the gap, the next label may be encoded while the first label is printed and applied. The overlapping of encoding and printing greatly enhances label processing throughput, and may be employed whenever the data to be encoded on the next label is known while the first label is still being processed.

The label processor may also incorporate a "reject and retry" function with regard to an incorrectly encoded label. Thus, if verification of a first label indicates an encoding error, the erroneously encoded label is transferred across the gap and past the printer, but is not applied. The next label is encoded and printed with the information meant for the first label, and is applied.

Whereas I have illustrated and described the preferred embodiment of the invention it is to be understood that I do not limit myself to the precise construction herein disclosed and the right is reserved to all changes and modifications coming within the scope of the invention as defined by the appended claims.

I claim:

1. On-demand apparatus for processing a plurality of closely spaced labels releasably mounted on a carrier strip which extends between first and second processing stations, comprising:
   means for processing one of said plurality of labels before processing labels adjacent said one of said plurality of labels; said means for processing one of said plurality of labels further comprising:
   means forming a loop of said carrier strip between said first and second processing stations, said loop having a gap at one end thereof;
   means for moving said first processing station over said one of said plurality of labels to process said one of said plurality of labels;
   means for transferring a processed label across said gap; and
   means for moving a transferred label through said second processing station independent of movement of said carrier strip at said first processing station by shortening said loop.

2. On-demand apparatus for processing a plurality of closely spaced labels releasably mounted on a carrier strip which extends from a supply roll past a first processing station to a second processing station, comprising:
  means for processing one of said plurality of labels before processing labels adjacent said one of said plurality of labels; said means for processing one of said plurality of labels further comprising:
  means forming a loop of said carrier strip between said first and said second processing stations, said loop having a gap at one end thereof;
  means for moving said first processing station over said one of said plurality of labels to thereby process said one of said plurality of labels;
  means for rewinding said supply roll to transfer a processed label across said gap; and
  means for moving a transferred label through said second processing station independent of movement of said supply roll by shortening said loop;
  whereby said plurality of labels may be processed without rewinding said supply roll.

3. On-demand apparatus for encoding magnetic data and printing on a plurality of closely spaced labels releasably mounted on a carrier strip which extends from a supply roll past a magnetic head to a printer, comprising:
  means for processing one of said plurality of labels before processing labels adjacent said one of said plurality of labels; said means for processing one of said plurality of labels further comprising:
  means forming a loop of said carrier strip between said magnetic head and said printer, said loop having a gap at one end thereof and being variably sized to permit movement of said carrier strip at said printer independent of movement of said supply roll;
  means for moving said magnetic head over said one of said plurality of labels to thereby encode magnetic data on said one of said plurality of labels;
  means for unwinding said supply roll to thereby transfer a magnetically encoded label across said gap; and
  means for moving a transferred label past said printer independent of movement of said supply roll by shortening said loop;
  whereby said plurality of labels may be processed without rewinding said supply roll.

4. The apparatus of claims 1 or 2 wherein said first processing station moves over said one of said plurality of labels in a direction parallel to said carrier strip to thereby process said one of said plurality of labels.

5. The apparatus of claim 3 wherein said magnetic head moves over said one of said plurality of labels in a direction parallel to said carrier strip to thereby encode magnetic data on said one of said plurality of labels.

6. The apparatus of claims 1 or 2 wherein said first and second processing stations comprise a magnetic encoder and a printer, respectively.

7. The apparatus of claim 1, 2 or 3 wherein the other end of said loop includes a movable dancer roller, around which said carrier strip passes, and wherein said loop is shortened by moving said dancer roller towards the gap end of said loop.

8. The apparatus of claim 3 wherein said means for moving said magnetic head comprises means for moving said magnetic head over one of said plurality of labels in a first direction to thereby encode one of said plurality of labels, and subsequently moving said magnetic head in the opposite direction over said one of said plurality of labels to verify the encoded data.

9. The apparatus of claims 1 or 2 wherein at least one edge of said one of said plurality of labels is between said first processing station and said loop.

10. The apparatus of claims 1 or 2 wherein said one of said plurality of labels is between said first processing station and said loop.

11. The apparatus of claim 3 wherein at least one edge of said one of said plurality of labels is between said magnetic head and said loop.

12. The apparatus of claim 3 wherein said one of said plurality of labels is between said magnetic head and said loop.

13. The apparatus of claims 1 or 2 wherein said first processing station moves parallel to said carrier strip towards said loop to process said one of said plurality of labels.

14. The apparatus of claim 3 wherein said magnetic head moves parallel to said carrier strip towards said loop to encode magnetic data on said one of said plurality of labels.

15. The apparatus of claim 14 wherein said magnetic head moves parallel to said carrier strip away from said loop to verify the magnetic data encoded on said one of said plurality of labels.

16. A method of on-demand processing one of a plurality of labels releasably mounted on a carrier strip in a label processor before processing labels adjacent said one of said labels wherein said carrier strip is wound on a supply roll and extends past a first processing station to a second processing station, and wherein said carrier strip forms a loop having a gap at one end thereof between said first and second processing stations, comprising the steps of:
  moving said first processing station over said one of said labels to process said one of said labels;
  unwinding said supply roll to transfer said one of said labels across said gap,
  moving said one of said labels past said second processing station by shortening said loop; and
  processing said label as it moves past said second processing station.

17. The method of claim 16 further comprising the steps of:
  moving said first processing station over the label adjacent said one of said labels to process the label adjacent said one of said labels.

18. The method of claim 17 wherein the step of moving said first processing station over the label adjacent said one of said labels is performed concurrently with the step of moving said one of said labels past said second processing station by shortening said loop.

* * * * *